United States Patent [19]
Arnold et al.

[11] Patent Number: 5,180,038
[45] Date of Patent: Jan. 19, 1993

[54] ELECTRONICALLY CONTROLLED PARKING BRAKE SYSTEM

[75] Inventors: James H. Arnold, Huntsville; Randal J. Perisho, Moberly; Michael D. DeWitt; Wayne L. Soucie, both of Columbia, all of Mo.

[73] Assignee: Orscheln Co., Moberly, Mo.

[21] Appl. No.: 825,503

[22] Filed: Jan. 24, 1992

[51] Int. Cl.$^5$ .............................................. B60T 13/04
[52] U.S. Cl. .................................. 188/171; 188/2 D; 74/89.15; 192/4 A; 192/8 C
[58] Field of Search ............... 188/2 D, 156, 157, 158, 188/162, 171, 173; 74/89.15; 192/4 A, 8 C, 1.37, 26

[56] References Cited

U.S. PATENT DOCUMENTS

| | | | |
|---|---|---|---|
| 3,236,121 | 2/1966 | Gdowik et al. | 188/171 |
| 3,346,079 | 10/1967 | Davis et al. | 188/170 |
| 3,842,950 | 10/1974 | Fontaine | 188/170 |
| 3,972,398 | 8/1976 | Chamberlain | 192/4 A |
| 4,191,283 | 3/1980 | Keeny, III | 192/26 |
| 4,532,462 | 7/1985 | Washbourn et al. | 188/162 |
| 4,546,298 | 10/1985 | Wickham et al. | 188/162 |
| 4,629,043 | 2/1986 | Matsuo | 192/4 A |
| 4,850,242 | 7/1989 | Hass et al. | 74/512 |
| 5,004,077 | 4/1991 | Carlson et al. | 188/162 |
| 5,029,681 | 7/1991 | Swiatek | 192/4 A |
| 5,036,961 | 8/1991 | Eberling et al. | 192/1.23 |
| 5,092,432 | 3/1992 | Taig | 188/171 |

Primary Examiner—Robert J. Oberleitner
Assistant Examiner—Kevin D. Rutherford
Attorney, Agent, or Firm—Laubscher & Laubscher

[57] ABSTRACT

An electronically controlled parking brake system for a vehicle including a housing connected with the vehicle chassis, a movable member adapted for connection with the parking brake cable of the vehicle, a main spring biasing the movable member toward a brake-applied position relative to the housing, an electric motor operable to displace the movable member toward a brake-released position relative to the housing, a retaining device normally retaining the movable member in the brake-released position, and a release device for releasing the retaining device, whereby the movable member is released for displacement by the main spring toward the brake-applied position. Preferably, the retaining device includes a helical clutch spring mounted concentrically on a rotatable drive screw that drives the movable member in the brake-released direction, and the release device includes a solenoid for releasing the clutch spring.

10 Claims, 2 Drawing Sheets

ELECTRONICALLY CONTROLLED PARKING BRAKE SYSTEM

STATEMENT OF THE INVENTION

An electronically controlled parking brake system is disclosed having a main spring for normally biasing a movable member relative to a housing toward a brake-applied position, thereby to tension the parking brake cable to apply the vehicle parking brakes, and electric motor means for driving the movable member in the opposite direction toward a brake-released position in which the tension is released from the cable. Manually-operable or solenoid-operable release means are provided for releasing retaining means that normally retain the movable member in the brake-released condition.

BRIEF DESCRIPTION OF THE PRIOR ART

In the motor vehicle brake art, it is typical for high gross weight vehicles to use air brake mechanisms which counteract springs in the service brake system. In order to set the parking brake, the air is released to the system, thereby applying brakes at all service wheels. On the other hand, medium gross weight vehicles (i.e., trucks in the weight range of about 15,000 to 33,000 pounds gross weight) do not normally use air brakes for primary braking, thereby limiting their access to multi-wheel types of parking brake systems. Owing to their weight, these heavy and medium duty vehicles normally avoid the use of pawls in their transmission systems, and consequently the transmissions do not have conventional "park" positions. In medium gross weight vehicles, a separate hydraulic brake mechanism actuated system is sometimes used to provide the parking brake function. However, not all vehicles in this environment have hydraulic systems capable of operating at the pressures and flow rates required to provide an effective parking brake function.

It is also known in the art to provide motor-driven brake systems, as evidenced by the prior patents to Davis et al U.S. Pat. No. 3,346,079, Fontaine U.S. Pat. No. 3,842,950, Chamberlain U.S. Pat. No. 3,972,398, Matsuo et al U.S. Pat. No. 4,629,043, Carlson et al U.S. Pat. No. 5,004,007 and Eberling et al U.S. Pat. No. 5,036,961, among others.

Furthermore, as evidenced by the prior patents to Gdowik et al U.S. Pat. No. 3,236,121 and Hass et al U.S. Pat. No. 4,850,242 releasable helical clutch springs concentrically mounted on a shaft have been provided for retaining the parking brake in the brake-applied condition. Upon separation of the end leg portions of the spring, the turns of the spring are expanded to release the shaft, thereby to release the parking brake. A solenoid-operated parking brake release system including such a helical clutch spring is shown in the Swiatek U.S. Pat. No. 5,029,681.

There also exists in the art electro/mechanical actuators for generating the loads required for parking brake systems. However, these devices do not provide the stored energy necessary to effect the parking brake function in the event of a power failure. The present invention was developed to improve the reliability of parking brake systems and also improve the control of the force and elapsed time required to operate the parking brake.

SUMMARY OF THE INVENTION

Accordingly, a primary object of the present invention is to provide an electronically controlled parking brake system including main spring means for biasing a movable member in a given direction relative to a housing for operating the parking brake cable to a brake-engaged condition, electric motor means for driving the movable member in the opposite direction toward a brake-released position, retaining means for retaining the movable member in the brake-released position, and release means for releasing the retaining means, thereby to permit the main spring means to displace the movable member toward the brakeapplied position.

According to a more specific object of the invention, the movable member is displaced relative to the housing by drive screw means driven by the electric motor, and the retaining means comprises a helical clutch spring mounted concentrically on the drive screw, the orientation of the turns of the helical spring being such that the drive screw may be rotatably driven in the brake-released direction, but retained against rotation in the opposite direction by the retaining means. The release means may be a manually-operable cable connected with one leg of the clutch spring, or an electrically operable solenoid mounted on the housing and connected with one leg of the clutch spring.

Another object of the invention is to provide improved means for releasing stored energy to actuate a parking brake, thereby to provide a system that is suitable for application on a wider variety of vehicles than previously addressed by current systems. This is accomplished by combining a main spring device, the flexibility and availability of electric motors, and a drive mechanism that converts rotary motion into linear motion with an electronics control package which controls the operation of various components within the system.

A further object of this invention is to provide a means for manual application of the parking brake in the event of electrical power failure. The automatic parking brake also provides a means for manual release after the parking brake is applied. Another function of this mechanism is to sense the amount of travel required to apply the brakes and apply this measurement to control the amount of release operation. By providing only the travel necessary to allow free movement of the vehicle, the time required to apply the parking brake system in normal operation or in the event of an emergency is greatly diminished.

The electronically controlled parking brake system can be applied or released manually, interlocked with the transmission shifter via separate switches to activate parking brake function, or switch-controlled by means other than the transmission shift interlock. It is designed to use stored energy from a spring mechanism, thereby to provide the parking brake function in the event of electrical or mechanical power failure. An important special design feature of this automatic parking brake device is its ability to compensate for deflection and brake wear by controlling the travel, speed and force generated by the system, thereby to minimize the effect of fatigue on brake mechanism components. An additional function of this automotive parking brake device is to provide additional output for dynamic braking requirements in the event of service brake failure.

BRIEF DESCRIPTION OF THE DRAWING

Other objects and advantages of the invention will become apparent from a study of the following specification, when viewed in the light of the accompanying drawing, in which.

DETAILED DESCRIPTION

Figure 1:
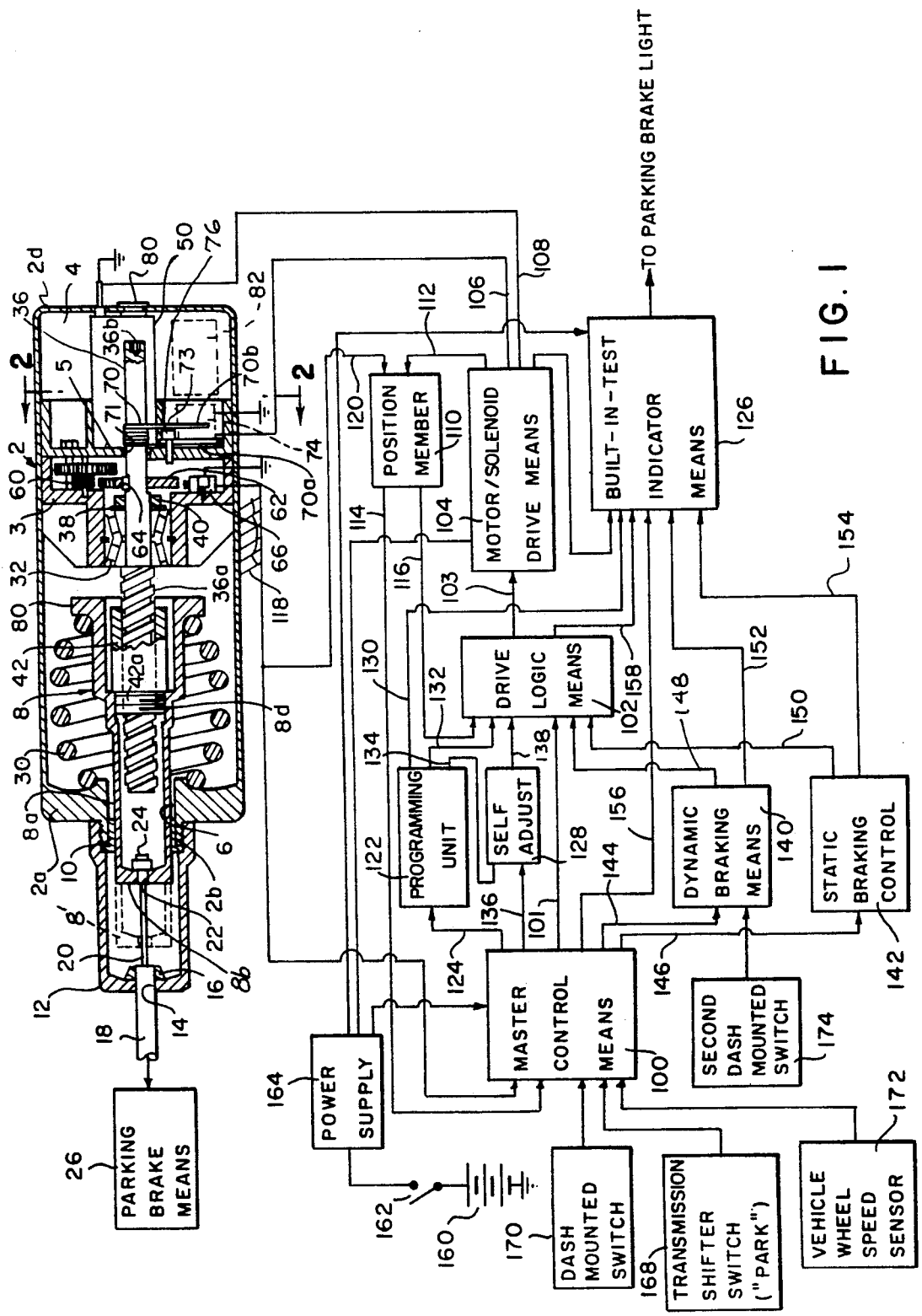
FIG. 1 is a sectional view of the electronically controlled parking brake system, the electronic control system being shown in block diagram form.

Referring first more particularly to FIG. 1, the electronically controlled parking brake system includes a housing 2 that is secured to the vehicle chassis and contains a chamber 4, the left hand end wall 2a of said housing containing an opening 6 that receives the cylindrical end portion 8a of a movable generally bell-shaped member 8, the cylindrical end portion being slidably guided within the opening 6 by an annular resilient bushing member 10. Threadably mounted on a neck portion 2b of the housing is a hollow cap member 12 having at one end an opening 14 in which is mounted by cable fastener means 16 one end of the outer tubular member 18 of the parking brake cable assembly, the inner cable member 20 being fastened within an opening 22 contained in the end wall of the movable member by suitable fastener means 24. At its other end, the inner cable member 20 is connected with the vehicle parking brake 26, as is known in the art.

Mounted within the housing chamber 4 concentrically about the movable member 8 is a strong compression main spring 30 one end of which engages the adjacent housing end wall 2a, and the other end of which engages radially outwardly extending annular end flange 8c of the movable member 8, thereby biasing the movable member 8 to the right toward its illustrated brake-applied position, whereupon the inner cable member 20 is tensioned to cause parking brake 26 to be in the brake-applied condition.

Rotatably mounted intermediate its ends within bearing means 32 supported by stationary housing intermediate wall 3 is the main drive screw 36. The drive screw 36 includes a threaded portion 36a of enlarged diameter, thereby defining an annular shoulder surface in abutting engagement with one end of the bearing means 32. At its other end, the bearing means 32 is engaged by washer 34 that is forced to the left into engagement with the bearing means 32 by the nut 40 that is threadably connected with the drive screw 36. Thus, the drive screw is maintained against longitudinal movement relative to the housing intermediate wall 2c, and is supported by bearing 32 for rotation relative to the housing. Threadably mounted upon the drive screw threaded portion 36a is a nut member 42 the left hand end of which is threadably connected with internal threaded portion 8d of the movable member 8. Thus, rotary drive movement of drive screw 36 causes displacement of movable member 8 in one direction relative to the housing 2, and rotation of the drive screw 36 in the opposite direction causes movable member 8 to be displaced in the opposite direction relative to housing 2.

Figure 2:
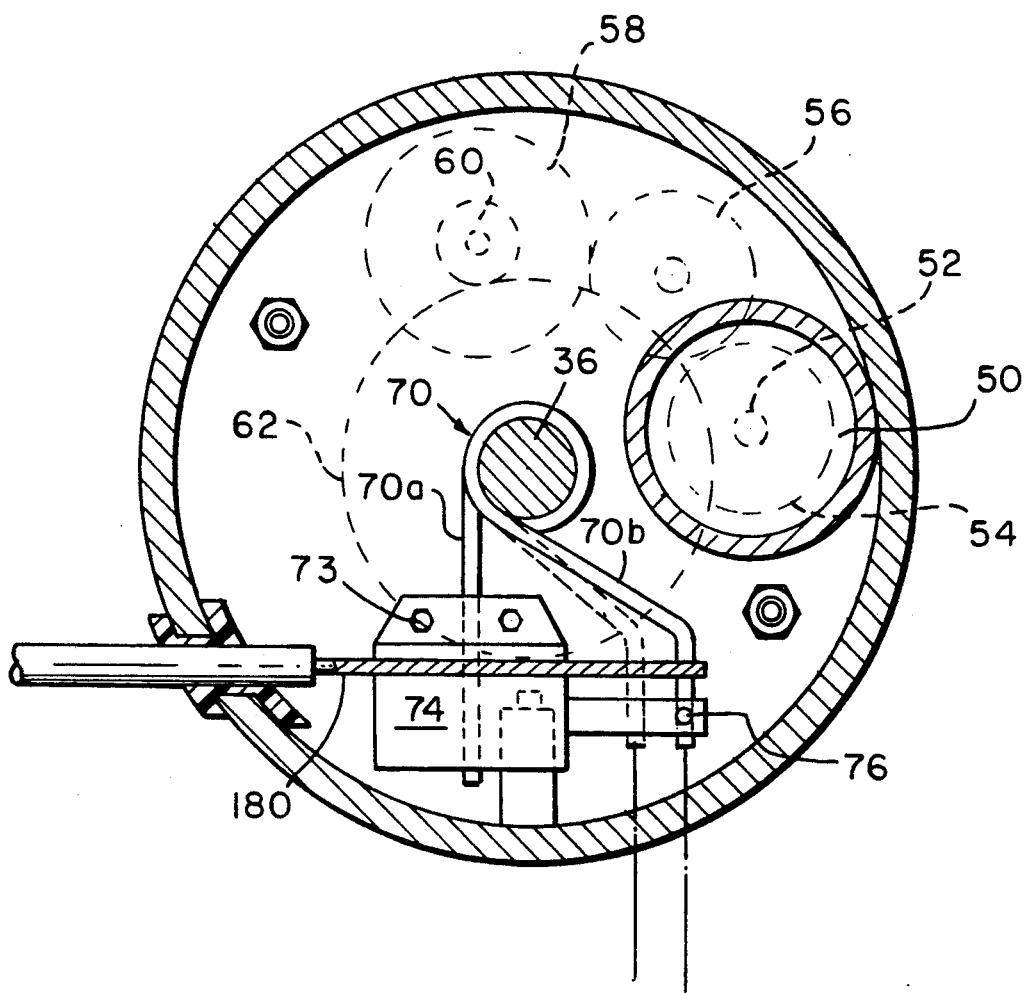
FIG. 2 is a sectional view taken along line 2—2 of FIG. 1.

Also mounted within the housing chamber 4 is a reversible direct-current motor 50 having an output shaft 52 (FIG. 2) that is connected with the drive screw 36 by a drive train including pinion 54 mounted on motor output shaft 52, intermediate gears 56, 58, and 60 and final gear 62 that is non-rotatably keyed with the drive screw 36 by means of key 64. Mounted on the intermediate wall 2c opposite the final gear 62 is a rotation counter 66 (for example, an optical sensor or the like) that counts the number of pulses (i.e. turns of the drive screw 36) as a function of the extent of travel of the movable member 8.

Mounted concentrically about the drive screw 36 is a helical clutch spring 70 which is provided at its ends with radially outwardly extending leg portions 70a 70b, respectively. The orientation of the turns of the helical clutch spring 70 is such as to permit rotation of the drive screw 36 in a direction to displace movable member 8 to the left toward the parking brake release position 8' illustrated in phantom in FIG. 1. The first leg portion 70a is rigidly connected with a second intermediate housing wall 5 that contains an opening for rotatably receiving the drive screw 36 and annular seal 71. Also mounted on the intermediate wall 2d by bolts 73 is the stator member of a solenoid 74 having an armature 76 connected with the movable other spring leg 70b. Thus, when the solenoid 74 is energized, the armature 76 is retracted (i.e. shifted to the left in FIG. 2), thereby to displace clutch spring leg 70b to the left relative to the first clutch spring leg 70a, whereby the turns of the clutch spring 70 are expanded to release the drive screw 36. As will be discussed in greater detail below, upon release of the clutch spring restraining means 70, the main spring 30 displaces the movable member 8 to the right toward the illustrated brake-applied position. The right hand end wall 2d of housing 2 contains an access opening opposite the adjacent end of the drive screw 36, which access opening is normally closed by a removable resilient closure cap 80. Upon removal of the closure cap 80, a suitable wrench may be inserted for engagement with a socket opening 36b in the right hand end of the drive screw 36, thereby to afford means for manually rotating the drive screw to displace the movable member 8 to compress main spring 30 in the direction allowed by clutch spring 70, thereby to provide for unit release.

Also contained within the housing chamber 4 is an electronics control pack 82, which contains the various solid state components illustrated in the block diagram circuit. More particularly, the operation of the electric motor 50 and the solenoid 74 are controlled by master controller 100 via conductor 101, drive logic means 102 and the motor/solenoid drive means 104 which contains the drive elements and power handling components required to power the motor and solenoid means, and which has output terminals connected with the solenoid 74 and with the electric motor 50 via conductors 106 and 108, respectively. An output of motor/solenoid drive means 104 is connected with position memory means 110 via conductor 112, which position memory means has a pair of outputs connected with master controller 100 and drive logic means 102 via conductors 114 and 116, respectively. The position memory means 110 provides functional information to the master controller 100 and drive logic means 102 for preventing "double cycling" (i.e., double apply or release), which would otherwise result in damage to the parking brake system and/or to the automatic parking brake system.

Shaft counter means 66 is connected with another input of position memory means 110 via conductors 118 and 120, and with another input of master control means 100 via conductors 118 and 121, thereby to provide a travel count for the dynamic braking control means 140 via conductor 144, and static braking control means 142 via conductor 146. Master control means 100 controls the sequencing and timing of the self-adjust unit 128, drive logic means 102, static braking control 142, and dynamic braking control 140. Also, another output of master control means 100 is connected with programming unit 122 via conductor 124, thereby to permit different programs to be run for different brake cables and installations. The programming unit has output terminals connected with built-in test indicator means 126 via conductor 130, drive logic means 102 via conductor 132, and self-adjust means 128 via conductor 134. The self-adjust means 128 has a second input supplied by an output of master control means 100 via conductor 136, and an output connected with drive logic means 102 via conductor 138. The master control means 100 thus controls the sequencing and timing of the self-adjust means 128, static braking control means 142, and dynamic braking control means 140, and also drive logic means 102, thereby initiate and control the sequencing of the motor/solenoid drive electronics. The self-adjust means automatically adjusts for wear in the brake shoes and in possible stretching and/or deflection of the parking brake cable 20. Master controller 100 also included a pair of outputs connected with dynamnic braking control means 140 and with static braking control means 142 via conductors 144 and 146, respectively. The dynamic braking control means 140 and the braking means 142 each have a pair of outputs connected with the drive logic means 102 via conductors 148 and 150, respectively, and with built-in test indicator means 126 via conductors 152 and 154 respectively. Master controller 100 and drive logic means 102 have outputs connected with built-in test indicator means 126 via conductors 156 and 158, respectively. The built-in test indicator monitors the operation of various functions while checking for malfunctions within each function. The output of the built-in test indicator means 126 is connected with the vehicle parking brake light, and power is supplied from the vehicle battery 160 via ignition switch 162 and the power supply means 164 which provides filtered, conditioned and regulated power to the various functions and to the motor and solenoid.

According to another characterizing feature of the invention, a further input to the master controller 100 is a transmission shifter lever switch 168, which is operable when the transmission shifter lever is displaced to a given position (for example, a so-called "park" position in transmission systems which do not actually have a park gear, so that the emergency brake system serves as a parking means). Other inputs to the master controller 100 include a dash-mounted manually operable switch 170, and a vehicle wheel speed sensor means 172. A second dashmounted switch 174 is provided for receiving selective operation of the dynamic brake control means 140.

OPERATION

In operation, assume that the electronically controlled parking brake apparatus is in the brake-actuated position illustrated in solid lines in FIG. 1, whereby the parking brake cable 20 is tensioned to activate the vehicle parking brake means 26. To release the parking brake means, either the dashmounted switch 170 is operated, or the transmission shifter lever is displaced from the "park" position to operate switch 168, whereupon the reversible direct-current motor 50 is energized via master controller 100, conductor 101, drive logic means 102, conductor 103, motor/solenoid drive means 104 and conductor 108. Screw shaft 36 is now rotated via the gear train connected with the output shaft of the motor, whereupon nut 42 and movable member 8 are simultaneously shifted to the left against the biasing force of the main compression spring 30. This displacement of the movable member 8 to the left is sensed by the counter means 66, and the corresponding signal is applied to the inputs of the position memory means 110 and the master controller 100. When the movable member 8 reaches the brake-released position 8' illustrated in phantom in FIG. 1, the energization of DC motor 50 is terminated, whereupon the movable member 8 is maintained in the brake-released position 8' owing to the cooperation between the turns of the helical clutch spring 70 and the peripheral surface of the drive screw 36. Thus, the parking brake means 26 is retained in the brake-released condition, and the vehicle is operated in a normal manner.

Assume that the vehicle is stopped, and the operator shifts the transmission shifter lever 168 to the "park" position. A signal is sent by switch 168 to the master controller 100 to energize solenoid 74 via conductor 101, drive logic means 102, conductor 103, motor solenoid means 104, and conductor 106. When the armature 76 of solenoid 74 is displaced to the left in FIG. 2, the end leg 70b of the clutch spring is displaced relative to stationary leg 70a to effect expansion of the turns of the clutch spring, thereby to release the drive screw 36. Main compression spring 30 then expands to displace the movable member to the right toward the illustrated brake applied position. If desired, during this movement of movable member 8 to the right toward the brake-actuated position, the electric motor 50 may be operated via master controller 100, dynamic braking control means 140, drive logic means 102, and motor/solenoid drive means 104 to control the speed of return travel of the movable member.

A first dash-mounted switch 170 is also provided that supplies a signal to master controller 100 for operating the release solenoid 74 as desired, and a second dash-mounted switch 174 is provided for selectively operating the dynamic braking control means 140 to cause the electric motor 56 to afford dynamic braking of the vehicle. Furthermore, according to an optional feature of the invention, vehicle wheel speed sensor means 172 supply an input signal to the master controller 100 for controlling operation of the motor and/or solenoid drive means, in the event that a given vehicle speed condition is sensed.

In accordance with an important feature of the invention, manually operable override cable means 180 (FIG. 2) are provided for displacing the movable clutch spring leg 70b in a direction to release the drive screw 36, thereby to override the system and to effect immediate release of the clutch spring, whereby the main spring 30 returns the system to its normal brake actuated condition.

Thus, the electronically controlled parking brake system is activated by an input from the control switch 168 in the shifter mechanism, or by means of the dash-mounted switch 170. Upon activation of either of these switches, the automatic parking brake mechanism releases the energy stored in the main spring 30 through the screw drive mechanism. This release establishes an equilibrium force tension between the compression spring 30 and the cable components to the brake friction material within the brake drum. During this sequence of operation, the counter 66 of the electronic control package counts the number of turns that the drive screw rotates and controls the total travel of the release cycle or the brake actuation cycle. Activation of the motor circuit causes rapid acceleration of the automatic parking brake components, thereby reducing the amount of time required to apply the brake. Also contained within this sequence is the release of the spring clutch 70 via the electrical solenoid 74 to allow the drive screw to rotate. Upon receiving an activation signal from either the interlock switch or the automatic override device, the system causes the release of the parking brake by compressing the spring within the automatic parking brake unit. Concurrent with the cycle, the electronic control package for the automatic parking brake system first causes the electric solenoid and spring clutch to become disengaged and the motor drive mechanism to be activated. The forces induced provide torque through the gear reduction mechanism to the drive screw components and convert rotary motion from the motor into linear motion used to compress the spring. Also within the sequence, the electronics package counts the number of rotations of the ball screw components to control the amount of energy to be stored in the compression spring. This allows the holding of the brake cable components at a minimum tension level thereby reducing the apply cycle times.

While in accordance with the provisions of the Patent Statutes, the preferred forms and embodiments have been illustrated and described, it will be apparent to those skilled in the art that changes may be made without deviating from the inventive concepts set forth above.

What is claimed is:

1. An electronically controlled parking brake system for tensioning the parking brake cable of a vehicle, comprising:
   (a) a housing (2) adapted for connection with the vehicle, said housing containing a longitudinally extending chamber;
   (b) a movable member (8) mounted for longitudinal movement within said chamber, said movable member being adapted for connection at one end with the parking brake cable;
   (c) main spring means (30) normally biasing said movable member in one direction relative to said housing toward a brake-engaged position;
   (d) drive means including an electric motor (50) for driving said movable member in the opposite direction relative to said housing toward a brake-released position, said drive means including;
      (1) a drive screw (36) longitudinally arranged within the chamber of, and rotatably connected with, said housing;
      (2) a drive nut (42) threadably mounted on said drive screw; and
      (3) means (42a) connecting said drive nut with said movable member;
   (e) retaining means (70) normally retaining said movable member in said brake-released position, said retaining means including a helical clutch spring (70) mounted concentrically about, and having turns normally biased radially inwardly into engagement with the outer periphery of, said drive screw, said clutch spring being arranged to permit rotation of said drive screw in the brake-releasing direction, but to prevent rotation of said drive screw in the opposite direction, said clutch spring having at each end a radially outwardly extending leg portion a first one of which is connected with said housing; and
   (f) release means for (74) releasing said retaining means, said release means being operable to displace the other of said spring leg portions relative to said first leg portion in a direction to expand said clutch spring turns, thereby to release said drive screw relative to said housing and to permit said main spring means to return said movable member to its brake applied position.

2. Apparatus as defined in claim 1, wherein said release means includes a solenoid (74) having a stator connected with said housing, and an armature (76) connected with said other clutch spring leg portion.

3. Apparatus as defined in claim 2, wherein said release means further includes position sensing means (66) for determining the extent of a displacement of said movable member from said brakeapplied position toward said brake-released position, and control means responsive to said position sensing means for controlling the release operation of said electric motor and said solenoid, whereby the extent of movement of said movable member and the time required for applying the parking brake system are reduced to a minimum, said position sensing means including a rotation counter (66) associated with said gear train.

4. Apparatus as defined in claim 3, and further including dynamic braking means (140) for operating said motor to control the return of said movable member from said brake released position to said brake applied position.

5. Apparats as defined in claim 4, wherein said electric motor is a reversible direct-current motor (50); and further including means for operating said motor when said movable member is in the brake-applied position to further drive the movable member in the brake-applied direction.

6. Apparatus as defined in claim 5, wherein said motor, said retaining means and said release means are contained within said housing.

7. Apparatus as defined in claim 2, wherein said vehicle includes a transmission shifting lever shiftable between various positions relative to the vehicle; and further including switch means (168) operable when said lever is in one of said positions for operating said solenoid means to release said retaining means.

8. Apparatus as defined in claim 1, wherein said electric motor includes an output shaft (52); and further wherein said drive means includes a gear reduction train connecting said motor output shaft with said drive screw.

9. Apparatus as defined in claim 8, and further including manually operable means (36b) for rotating said drive screw, thereby to displace said movable member relative to said housing.

10. Apparatus as defined in claim 1, wherein said release means includes a manually operable release cable (180) connected for movement relative to said housing, said release cable being connected with said other spring leg portion.

* * * * *